3,002,019
ALIPHATIC ACID SEPARATION

Funston G. Lum, Richmond, Calif., assignor to California Research Corporation, San Francisco, Calif., a corporation of Delaware
No Drawing. Filed Sept. 22, 1958, Ser. No. 762,240
5 Claims. (Cl. 260—537)

This invention relates to a process for isolating and separating in the form of their full salts straight chain aliphatic dibasic acids from their branched chain isomers and more particularly to a novel method for removing pure sebacic acid from reaction mixtures containing sebacic acid, isomeric $C_{10}$ acids, such as 2,2'-diethyl adipic acid and 2-ethyl suberic acid, as well as certain $C_5$–$C_9$ monobasic acids.

U.S. Patent 2,749,364 discloses a method for the recovery of $C_{10}$ aliphatic dibasic acids from mixtures of salts of sebacic acid and other isomeric $C_{10}$ acids, together with small amounts of other acids, including monobasic carboxylic acids obtained by carbonation and hydrogenation of the dimetallic products formed by treating butadiene with finely dispersed sodium or potassium in a selected ether medium in the presence of a relatively small amount of polycyclic aromatic hydrocarbons and/or a solid attrition agent at a temperature preferably below 0° C. These $C_{10}$ dicarboxylic acids are obtained in the form of the full alkali metal salts, that is, salts in which both hydrogens of the acid groups have been replaced by an alkali metal cation, as distinguished from the half or acid salt referred to as such.

In the practice of the aforesaid patent when using sodium as the metal, a typical mixture comprises the $C_{10}$ dicarboxylic acids in the form of the sodium salts, sodium salts of various monobasic $C_5$ and $C_9$ acids, small traces of hydrogenation catalysts, condensed polymeric acids, and about 15% sodium chloride. Further, in accordance with the teaching of that patent, benzene is added to the mixture in an amount about equal to 20% of the total volume of the aqueous reaction mixture, followed by addition of concentrated hydrochloric acid in amounts varying between 5 and 10% by volume of the aqueous mixture to the mixture so as to form the monosodium salts of sebacic acid and the isomeric $C_{10}$ acid product. The solution is then saturated with sodium chloride, whereupon there are formed a solid phase of monosodium sebacate and a liquid phase, having the monosodium isomeric $C_{10}$ acids and the other impurities concentrated, respectively, in the aqueous and benzene layers thereof. A mixture of the isomeric $C_{10}$ acids is later separated from the aqueous layer of the liquid phase, the composition of the mixture, known as "Isosebacic" acid, being approximately,

| | Percent |
|---|---|
| Sebacic acid | 6–10 |
| 2,2'-diethyl adipic acid | 12–18 |
| 2-ethyl suberic acid | 72–80 |

The method of separation described in the aforesaid patent suffers from certain disadvantages. The first disadvantage is the necessity of converting the alkali metal salts of sebacic acid and the isomeric $C_{10}$ acids to the monoalkali metal salts, which requires initial accurate determination of the free alkali and total organic acid content and then controlled addition of mineral acid to convert full salts to the half salts. A second, and more important disadvantage in the prior art method, is the fact that the separations are incomplete. Although substantially pure sebacic acid can be obtained, a considerable amount of the sebacic acid originally present in the reaction mixture is not recovered but is found in the "Isosebacic" acid. Sebacic acid is commercially more valuable than the "Isosebacic" acid, and as a result, as complete a recovery of sebacic acid as possible is strongly desired. Furthermore, in the event it is desired to separate the 2,2'-diethyl adipic acid from the 2-ethyl suberic acid, which are both contained in the "Isosebacic" acid mixture, it is advantageous to effect such separation in the absence of sebacic acid contaminant, which being present makes the separation of the other fractions more difficult.

Accordingly, an object of the present invention is to provide a process for effecting separations such that one portion contains substantially pure sebacic acid and the other portion contains a mixture of various isomeric $C_{10}$ acids substantially free from the presence of sebacic acid.

It has been discovered that the alkali metal salts of sebacic acid are substantially completely insoluble in water miscible aliphatic monohydric alcohol-water mixtures containing high percentages of alcohol. This is surprising inasmuch as the alkali metal salts of isomeric $C_{10}$ acids, more specifically, mixtures composed primarily of 2,2'-diethyl adipic acid and 2-ethyl suberic acid are quite soluble in such alcohol-water mixtures, and sebacic acid would likewise be expected to be soluble therein.

Based on the foregoing discovery of the insolubility of the alkali metal salts of sebacic acid in water-miscible alcohol-water mixtures, a process for the separation of alkali metal salts of sebacic acid form mixtures of alkali metal salts of sebacic acid and the same alkali metal salts of certain isomeric $C_{10}$ acids, primarily 2,2'-diethyl adipic acid and 2-ethyl suberic acid, has been developed which comprises intimately mixing this mixture of salts with a concentrated aqueous solution of a water-miscible alcohol, the quantity of solution present being insufficient to dissolve all of the salts, but being sufficient to dissolve all of the alkali metal salts of the isomeric $C_{10}$ acids, separating a solid phase and a liquid phase, regenerating substantially pure sebacic acid from the solid phase, and, if desired, regenerating substantially pure isomeric $C_{10}$ acids from the liquid phase. The method is peculiar to the separation of sebacic acid from its branched-chain isomers. For example, it has been attempted experimentally to separate 2,2'-diethyl adipic acid from 2-ethyl suberic acid by means of the methods employed in this invention, but such separation has proved to be totally ineffective.

The method of forming the separable mixture is not critical. For example, solid $C_{10}$ salts can be added to the alcohol-water mixture or alcohol can be added to an aqueous solution or mixture of the salts.

Suitable alcohols for forming the alcohol-water mixture are the water-miscible monohydric aliphatic alcohols, i.e., the monohydric aliphatic alcohols soluble in all proportions in water: methanol, ethanol, n-propanol, isopropanol, and tert-butanol. Isopropanol and ethanol are preferred since they are economical to use, readily available, and can be used to precipitate out the alkali metal sebacate even when a fairly large amount of water is present. In forming the alcohol-water solution the volume ratio of alcohol to water can range from about 2:1 to 20:1. It has been found that the minimum alcohol-water ratio required for ideal separations varies inversely to the molecular weight of the alcohol. Hence, the preferred minimum volume ratio of alcohol to water ranges from about 2:1 when isopropanol, n-propanol, or tert-butanol is employed, from about 5:1 when ethanol is employed, and from about 10:1 when methanol is employed.

The amount of concentrated aqueous solution of a water-miscible alcohol employed in separating the alkali metal salt of sebacic acid and the same alkali metal salts of isomeric $C_{10}$ acid from mixtures thereof may be any amount insufficient to dissolve all of the salts when the mixture has been brought into equilibrium, as by intimate admixing of the solid and liquid phases. The amount of aqueous solution of any particular water-miscible alcohol in any given concentration which is just sufficient to entirely dissolve the alkali metal salts of the isomeric $C_{10}$ acids may be simply determined. Measured amounts of the mixtures of the salts of the isomeric $C_{10}$ acids are added to the aqueous solution of water-miscible alcohol at the desired temperature of operation until the solution has become sufficiently concentrated with respect to the alkali metal salts of the isomeric $C_{10}$ acids and begins to form a solid phase. From such measurements the amount of concentrated aqueous solution and water-miscible alcohol required to just dissolve all of the alkali metal salts of the isomeric $C_{10}$ acids present in any given mixture may be readily calculated.

Separations can be carried out at any practical temperature. Room temperatures such as about 25° C. are particularly convenient since they require neither heating nor cooling.

More specifically, one method that can be used to form a separable mixture is to dissolve in water a mixture of the alkali metal salts of sebacic acid and the same alkali metal salts of the isomeric $C_{10}$ acids so as to form a homogeneous solution. The desired amount of alcohol is then added, whereupon the alkali metal sebacate present is precipitated. The precipitate is then separated from the mother liquor by conventional means, e.g., filtration, decantation, centrifugation. The precipitate may then be washed with small portions of a water-miscible alcohol water mixture, having the preferred ranges mentioned above in order to remove any alkali metal salts of the isomeric acids which may tend to cling to the filter cake.

The initial filtrate is combined with the washes. The precipitate is dissolved in water, and the sebacic acid recovered upon acidification with a mineral acid. The isomeric $C_{10}$ acids in the initial filtrate and washes can be recovered, if desired, upon acidification with a mineral acid.

If the $C_{10}$ acids are originally present as the acids themselves rather than as alkali metal salts they are converted to alkali metal salts in any convenient manner, such as admixing them with a sufficient quantity of an alkali metal base in water to convert them to the salt. The alcohol can then be added as described above.

This invention can better be illustrated by means of the following examples, which, however, are not meant to limit it:

*Example I*

A solution having the following composition by weight was prepared:

Sodium "Isosebacate" _____ 30
Water _____ 70

330 parts by weight of ethanol were added to the solution. A precipitate appeared. The precipitate was removed by filtration, and the filtrate reserved. The precipitate was washed with 10 to 1 ethanol water solution. The washes were added to the original filtrate. The precipitate was dissolved in water, reprecipitated with hydrochloric acid, and washed with water. The amount of sebacic acid recovered amounted to about 70% of the sebacic acid present in the original "Isosebacic" acid.

*Example II*

A solution having the following composition by weight was prepared:

Potassium "Isosebacate" _____ 35
Water _____ 65

510 parts by weight of isopropanol were added to the solution. A precipitate appeared. The precipitate was removed by filtration, and the filtrate reserved. The precipitate was washed with 10:1 isopropanol water solutions. The sebacic was regenerated as described in Example I. The amount of sebacic acid recovered amounted to about 60% of the sebacic acid present in the original "Isosebacic" acid.

Commercial "Isosebacic" acid was purposely used in the above examples to show how the sebacic acid remaining in the isomeric $C_{10}$ acids can be removed by the process of this invention. No essential change in the process is necessary when applied to mixed acids having higher sebacic acid content as shown by the following example:

*Example III*

A mixture having the following composition by weight was prepared:

Sodium sebacate _____ 9
Sodium 2-ethyl suberate and 2,5-diethyladipate _____ 21
Water _____ 70

This mixture showed some separated sodium sebacate. 220 parts by weight of isopropanol were added to increase the separation of the sodium sebacate. The precipitate was removed by filtration and washed with 5:1 isopropanol water mixture. The sebacic acid was regenerated as described above. The amount of sebacic acid recovered amounted to about 90% of the sebacic acid added.

I claim:

1. Process for separating a full alkali metal salt of sebacic acid from the full alkali metal salt of "Isosebacic acid" which comprises mixing the full alkali metal salt of "Isosebacic acid" with an unsubstituted water miscible aliphatic monohydric alcohol and water, the volume ratio of alcohol to water being in the range 2:1 to 20:1, the amount of alcohol and water employed being sufficient to dissolve substantially all of the full alkali metal salt of the isomers of sebacic acid contained in the "Isosebacic acid" salt but insufficient to dissolve a substantial quantity of the full alkali metal salt of sebacic acid, separating the dissolved salt from the undissolved full alkali metal sebacic acid salt.

2. Process according to claim 1 in which in addition sebacic acid is regenerated from the full alakali metal sebacic acid salt.

3. Process according to claim 1 wherein the alcohol is selected from the group consisting of ethanol and n-propanol and isopropanol.

4. Process according to claim 1 wherein the alcohol is ethanol and the ratio by volume of ethanol to water ranges from 5:1 to 20:1.

5. Process according to claim 1, wherein the alkali metal is sodium.

References Cited in the file of this patent

Noller: Chemistry or Organic Compounds, 2nd edition, page 794.